UNITED STATES PATENT OFFICE.

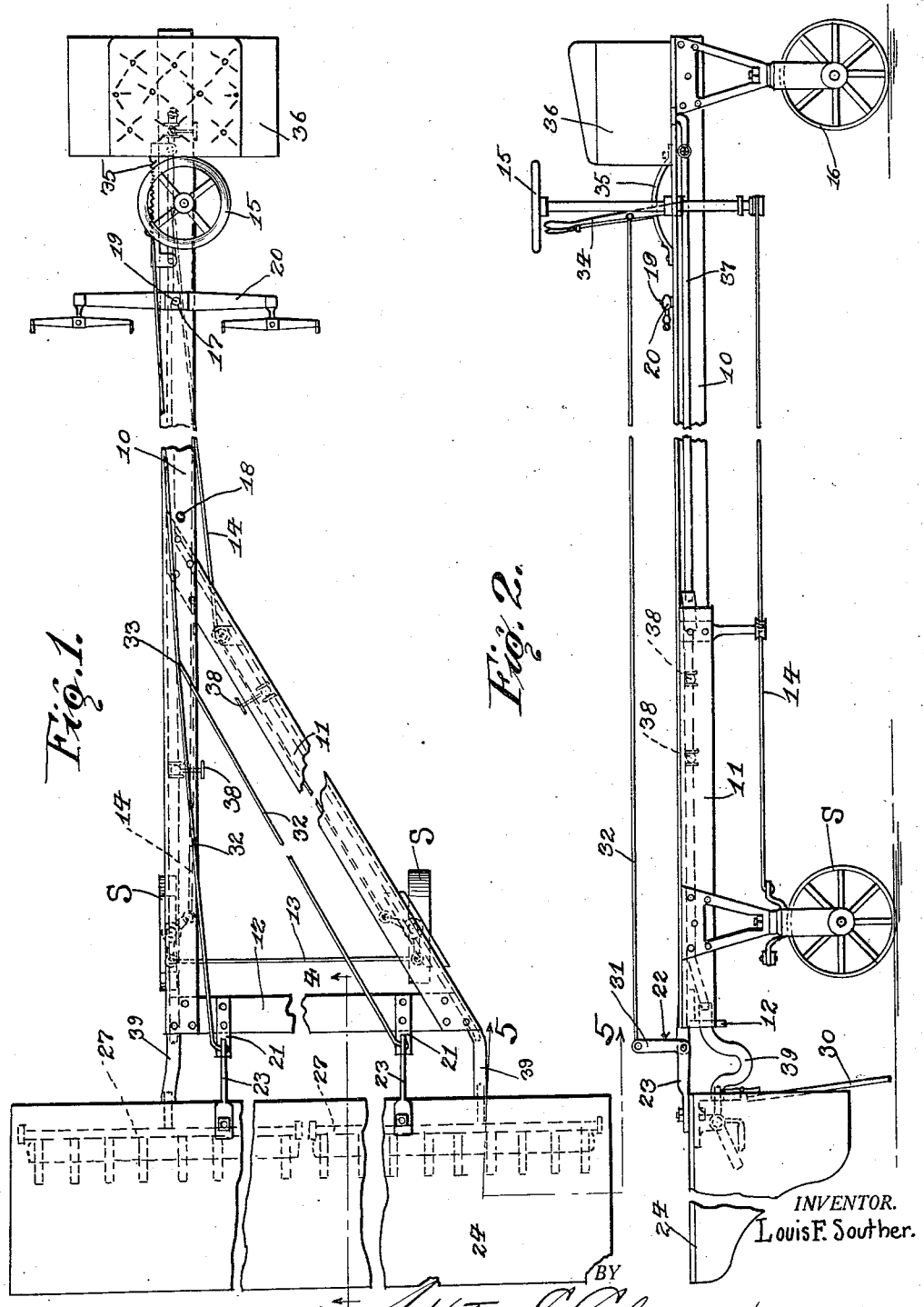

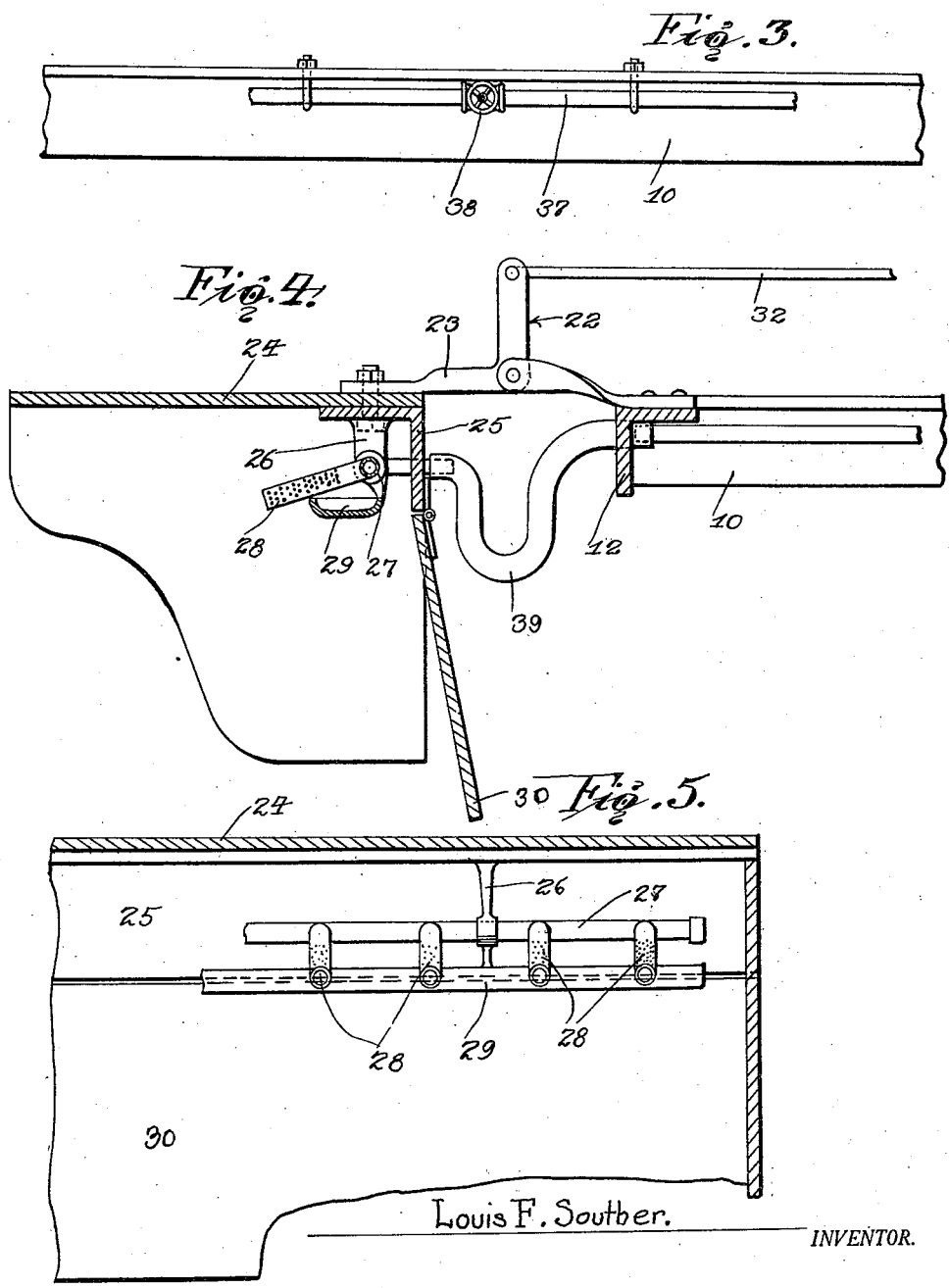

LEWIS FREAMON SOUTHER, OF LARSON, NORTH DAKOTA.

WEED AND INSECT BURNER.

1,415,491.   Specification of Letters Patent.   Patented May 9, 1922.

Application filed December 11, 1920. Serial No. 430,038.

*To all whom it may concern:*

Be it known that I, LEWIS F. SOUTHER, a citizen of the United States, residing at Larson, in the county of Burke and State of North Dakota, have invented certain new and useful Improvements in Weed and Insect Burners, of which the following is a specification, reference being had to the accompanying drawings.

This invention relates to improvements in weed and insect burners.

An important object of the invention is to provide an implement of this character which may be either pushed or drawn as desired. It will be obvious that when employing a device of this character for the burning of green weeds to destroy the same before the seed pods thereof mature, and to likewise destroy grasshoppers and similar insects infesting the pod, it is desirous that the flame bearing portion of the device be positioned in advance of the draft in order that the draft animals or tractor employed may not frighten the insects so as to cause them to leave the path of the device. When, however, it is desired to burn dry weeds, it is necessary that the draft precede the implement in order that the draft animals or tractor employed may not pass through the burning area.

A further object of the invention is to provide a device of this character which may be very cheaply constructed and which is comparatively long lived in order that the same may be commercially practical.

Other objects and advantages of the invention will become apparent throughout the course of the following description:

In the accompanying drawings, wherein for the purpose of illustration is shown a preferred embodiment of my invention and wherein like reference characters designate like parts throughout:

Figure 1 is a plan view of a weed and insect burner constructed in accordance with my invention;

Figure 2 is a side elevation thereof;

Figure 3 is a fragmentary detail view showing the mounting of the feed pipes upon the frame;

Figure 4 is a section on the line 4—4 of Figure 1, and

Figure 5 is a section on the line 5—5 of Figure 1.

In the construction of my invention I preferably employ a bar of heavy angle iron 10 which is provided approximately centrally thereof with an attached bar 11 extending forwardly at an angle to the bar 10. The forward ends of the bar 10 and the auxiliary bar 11 are connected by a cross brace 12. The forward ends of the bars 10 and 11 are each provided with a steering supporting wheel S suitably connected, as at 13, so that they will move in unison. These wheels are likewise connected in the usual manner by cables 14 to the steering wheel 15 disposed at the rear end of the bar 10 so that the wheels S may be turned to steer the device. The rear end of the bar 10 is supported by a caster wheel 16. The bar 10 is provided intermediate the steering wheel 15 and the point of attachment of the auxiliary bar 11 with a pair of spaced openings 17 and 18 adapted for the interchangeable reception of attaching means 19 for a whiffletree 20, in order that a team may be attached to either push or draw the device as desired.

Secured to the brace 12 and extending forwardly therefrom at spaced points are supports 21 upon which are pivotally mounted bell crank levers 22, one arm of which extends forwardly in a normally horizontal direction. To the free ends of these arms 23 of the bell crank levers 22 is secured a plate 24 extending transversely of the forward end of the machine and forwardly from the forward ends of the arms 23. This plate if desired may be suitably braced by an angle iron member 25 extending longitudinally of the rear edge thereof. Extending downwardly from the angle iron brace 25 are hangers 26 in which are mounted lengths of pipes 27, a pair of lengths being provided each equal to one-half the length of the plate 24 and having their adjacent ends closed.

Each of the pipes 27 is provided at spaced intervals with burning nozzles 28 preferably of the blow torch type directed rearwardly and downwardly. Each of the lengths of pipe 27 is provided beneath the burners 28 thereof with a longitudinally extending trough 29 for the reception of fuel by means of which the burners may be heated when starting the device. To the lower edge of the angle iron 25 is pivotally connected a drag plate 30 which drags upon the ground preventing the passage of insects therebeneath and necessitating the insects keeping in front of the flame from the nozzle 28.

The arms 31 of the bell crank levers 22 have secured thereto flexible elements 32, preferably joined, as at 33, and extending rearwardly and secured to an operating lever 34 which operates in conjunction with the segment 35. It will be obvious that the plate 24 and its associated elements may be vertically adjusted and held in such vertical positions when desired. The rear end of the bar 10 has mounted thereon a tank 36 from which a feed pipe 37 extends forwardly and is provided preferably at the point of attachment of the auxiliary bar 11 with a Y fitting so that the feed conduit is divided into two branches. each of which is provided with a valve 38. The forward ends of the branches are connected by a flexible conduit, as at 39, with their respective lengths of pipe 27. It will be obvious that the fuel feed to either length of pipe may be discontinued when desired so that either one or both of the lengths may be utilized.

It will likewise be obvious, from the foregoing. that I have constructed a weed and insect burner which is extremely simple in its construction and operation and which, accordingly, may be extremely cheaply manufactured; and it will also be obvious that the construction of the same as hereinbefore set forth is capable of some change without in any manner departing from the spirit of my invention. I, accordingly, do not limit myself to the specific structure hereinbefore set forth, except as limited by the subjoined claims.

What I claim is:—

1. A weed and insect destroyer comprising a deflector plate, an angle iron supporting member, said member having one flange thereof secured to the lower face of said plate, brackets depending from said flange, burner means carried by the brackets, a drag plate hinged to the lower portion of the remaining flange of said angle iron supporting member, and means for pivotally connecting said deflector plate to a support.

2. A weed and insect destroyer comprising a vehicle frame, arms carried by and projecting beyond one end of said frame, bell crank levers pivoted to said arms, means for actuating said bell crank levers, a deflector plate secured to one of the arms of each of the bell crank levers, a supporting member secured to the lower face of said plate adjacent one longitudinal edge of said plate, said supporting member including a flange depending at right angles to said supporting member, brackets depending from the supporting member substantially parallel to the flange of said member, burner means supported by said brackets, and a drag plate hingedly connected to the outer face of the flange, one longitudinal edge of said plate being adapted to engage the ground.

In testimony whereof I hereunto affix my signature.

LEWIS FREAMON SOUTHER.